United States Patent [19]

Fulton, Jr.

[11] 3,978,282

[45] Aug. 31, 1976

[54] APPARATUS AND METHOD FOR MEASURING THE TRANSMISSION CHARACTERISTICS OF A NETWORK

[75] Inventor: Forrest F. Fulton, Jr., Los Altos Hills, Calif.

[73] Assignee: Avantek, Inc., Santa Clara, Calif.

[22] Filed: Feb. 4, 1971

[21] Appl. No.: 112,714

[52] U.S. Cl............................ 178/69 G; 178/69 A; 178/DIG. 4; 178/DIG. 13; 179/15 BE; 179/175.3 R; 324/57 SS; 324/58 A
[51] Int. Cl.² ................. H04N 7/10; G01R 27/04
[58] Field of Search............ 178/DIG. 4, 69 R, 69 A, 178/69 G, DIG. 13; 179/175.3 R, 15 BF, 15 BP; 324/58 R, 58 A, 57 SS, 57; 325/31, 67, 363, 308; 333/17 R; 340/177 CA, 177 VZ

[56] References Cited
UNITED STATES PATENTS

| | | | |
|---|---|---|---|
| 1,590,362 | 6/1926 | Gibson | 179/15 BP |
| 2,588,730 | 3/1952 | Johnson | 324/57 R |
| 2,685,062 | 7/1954 | Schroeder et al. | 324/57 R |
| 2,945,178 | 7/1960 | Doba, Jr. | 179/175.3 |
| 3,360,729 | 12/1967 | Palatinus | 325/67 |
| 3,487,169 | 12/1969 | Miyagi | 179/15 BP |
| 3,651,403 | 3/1972 | Fluck, Jr. | 178/DIG. 4 |
| 3,697,878 | 10/1972 | Georgescu | 324/57 R |

Primary Examiner—George G. Stellar
Attorney, Agent, or Firm—Limbach, Limbach & Sutton

[57] ABSTRACT

A substantially non-interfering, low-intensity sweeping test signal is transmitted along a network to be tested. Means are provided for receiving and tracking the test signal at the opposite end of the network. A reference signal is transmitted along with said test signal for alerting and synchronizing the operation of the tracking means. The reference signal is at a frequency outside of the range of operating or normal signals transmitted over the network. Desirably the reference signal comprises a sweeping and a fixed frequency signal. These are then used to generate the sweeping test signal. Also, the reference signal is used by the tracking means for processing the received test signal.

25 Claims, 23 Drawing Figures

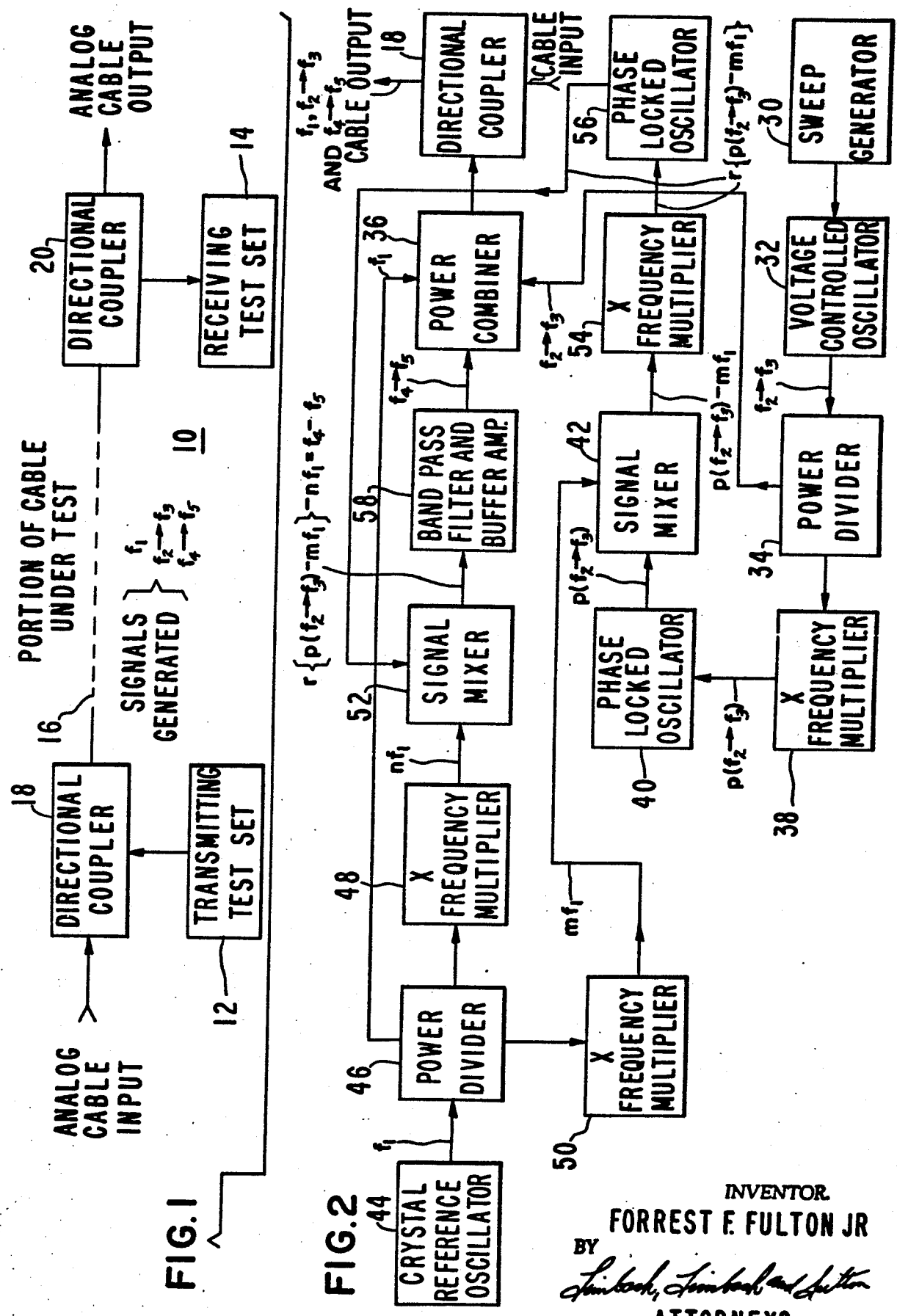

INVENTOR
FORREST F. FULTON JR
BY Limbach, Limbach & Sutton
ATTORNEYS

INVENTOR
FORREST E FULTON JR.

SWEEP/REFERENCE AMP

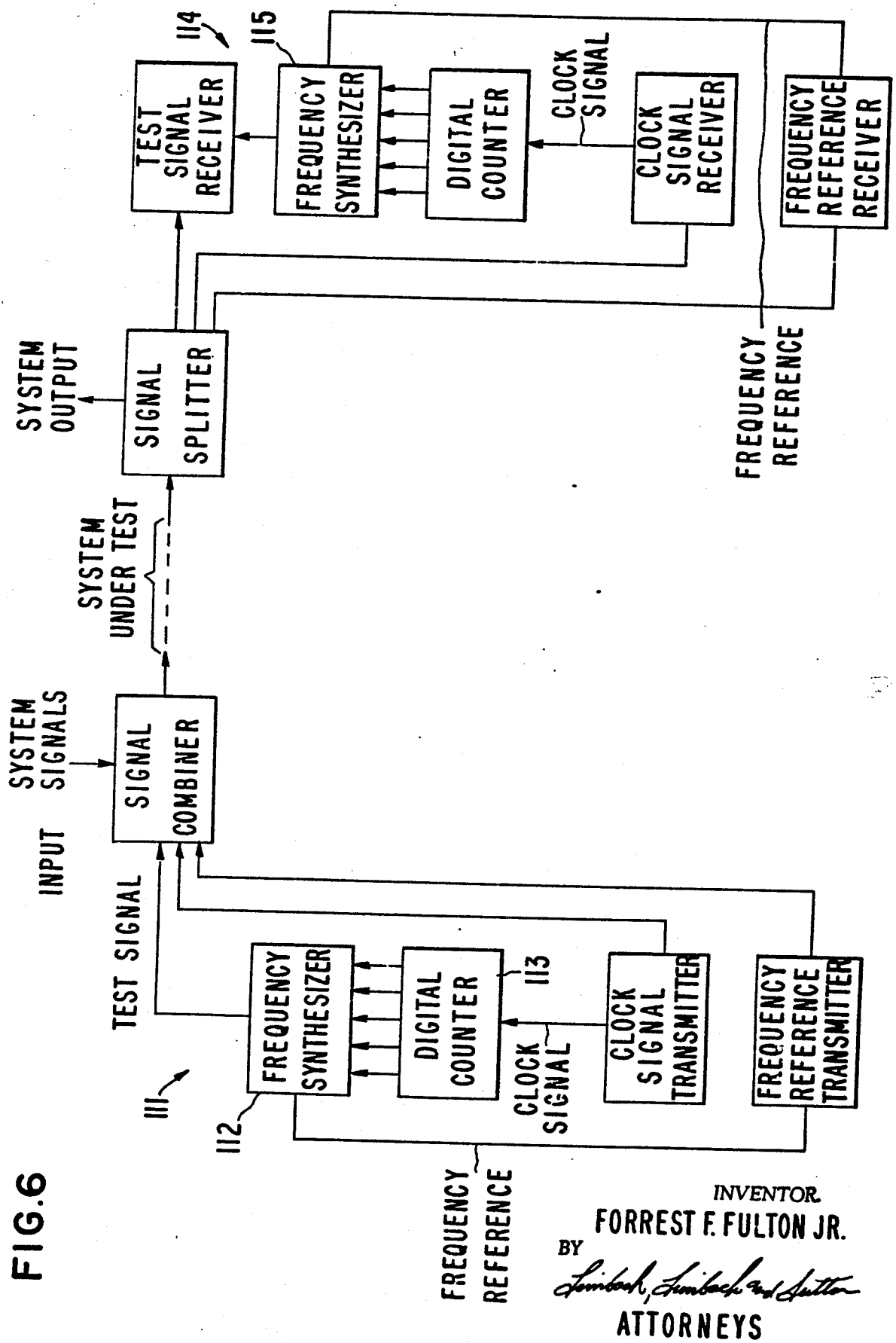

APPARATUS AND METHOD FOR MEASURING THE TRANSMISSION CHARACTERISTICS OF A NETWORK

BACKGROUND OF THE INVENTION

The present invention relates to a method of, and apparatus for, measuring the swept frequency transmission response of a communications network, as, for example, an analog cable network, and more particularly, to one which measures on a continuous basis in the presence of normal signal activity without interfering in any substantial manner with the reception of those signals.

Until recently, the usual method of making swept frequency response measurements on a transmission network such as, for example, an analog cable system, was to connect a sweep frequency oscillator directly to the cable system. A detector was placed at some other location with the portion of the cable system under test between the oscillator and the detector. The difference between the output power of the sweep frequency oscillator and the input power to the detector represents the transmission response. The chief disadvantage of this type of measurement is that the portion of the cable under test must be disconnected from the system during the test. Therefore, transmission of operational or normal signals ceases during this period.

Another technique for making swept frequency response measurements on cable systems employs a "summation sweep" technique intended for CATV systems. This technique is similar to the above described system with the exception that normal signals are present when the sweep occurs. In order to distinguish the test signal from normal signals, it is necessary to operate the test signal at a high level, usually 20 dB above the normal signals. In order to minimize the interfering effect of the test signal when it sweeps past the television video carriers, the sweep is accomplished in a very short time interval. Nevertheless, fast sweep speed notwithstanding, a noticeable interference is observed on the television screen the instant the test signal sweeps past the video carrier.

SUMMARY OF THE INVENTION

It is therefore an object of the present invention to provide an improved method and apparatus for measuring the transmission characteristics of a transmission network. Another object of the invention is to accomplish sweep measurements on a continuous basis over a transmission network with all normal signals present, in such a manner that no substantial interference is observed.

In accordance with the present invention means are located at one end of the network being tested for transmitting a sweeping frequency test signal along the network. The range of frequencies includes the range of frequencies of signals normally transmitted over the network. The test signal has an intensity below that of normal or regular signals transmitted across the network so that there is no substantial interference to these signals.

At the opposite end of the transmission network means are provided for tracking the sweeping frequency test signal and for monitoring the intensity thereof, thereby providing an indication of the transmission characteristics of the network over the bandwidth of the regular signals.

Along with the sweeping test signal a reference signal, interrelated with said sweeping test signal and desirably comprising a sweeping reference signal and a fixed frequency reference signal, is transmitted along the network under test. These signals provide two functions. First, they are used to generate the sweeping test signal and, secondly, they are utilized by the tracking or receiving end to process the sweep test signal in a manner which will be described subsequently. The bandwidth of the sweeping reference signal and the frequency of the fixed frequency reference signal are selected so that they do not interfere with the regular signals transmitted along the network, thus allowing testing to occur simultaneously and without interference to the normal signals being transmitted across the network.

In particular, the sweeping test signal is generated as follows. The sweeping reference signal, which has a comparatively narrow bandwidth, is multiplied to increase the bandwidth thereof. In doing so the frequency range is increased above that of the signals normally transmitted across the network. To lower the frequency range, a multiplied version of the fixed frequency signal is mixed and subtracted from the high frequency sweep reference signal to bring it within the frequency range of the normal signals.

The tracking or receiving end utilizes a heterodyning arrangement to provide a narrow IF passband in order to track the low-intensity sweeping test signal. In the preferred embodiment of the invention the fixed frequency and sweeping reference signals are utilized in place of local oscillators to mix and "beat down" the sweeping test signal to a narrow bandwidth. The latter is required to track the low-intensity sweeping test signals.

The invention is particularly well suited to perform measurements on such repeatered analog cable systems as Community Antenna Tele Vision (CATV) and the L-4 and L-5 carrier systems of the American Telephone and Telegraph Company.

This invention contributes significantly to the art of present-day analog cable transmission measurement by avoiding the need to either remove all normal signals from the cable system or tolerate undesirable test signal interference when making swept frequency response measurements.

BRIEF DESCRIPTION OF THE DRAWINGS

FIG. 1 is a generalized block diagram of an apparatus for measuring the transmission characteristics of a transmission network in accordance with the present invention.

FIG. 2 is a block schematic diagram of the transmission test set shown in FIG. 1.

FIG. 6 is a generalized block diagram of another embodiment of this invention.

DESCRIPTION OF THE PREFERRED EMBODIMENT

Figure 3:
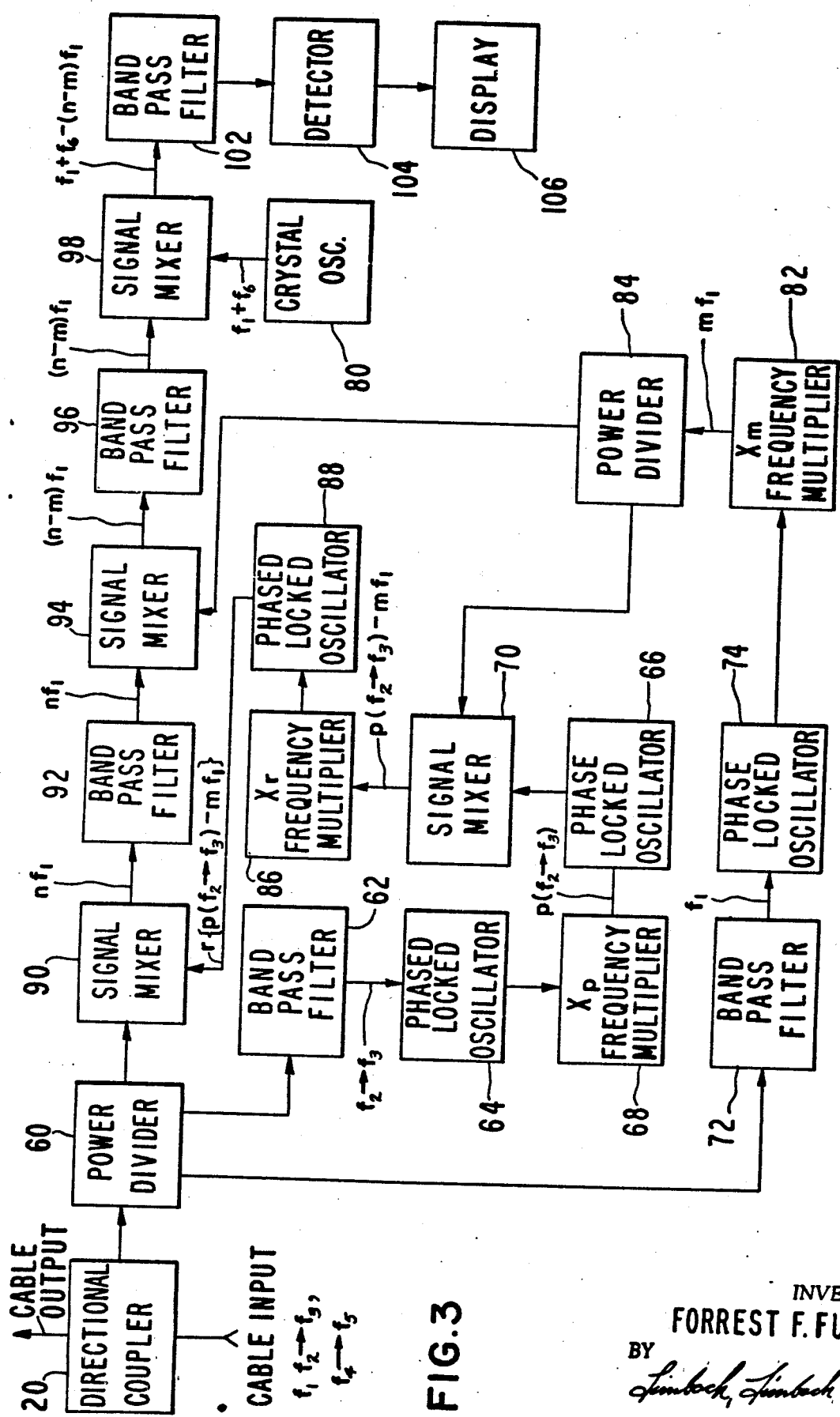
FIG. 3 is a block schematic diagram of the receiving test set shown in FIG. 1.
Figure 4B:
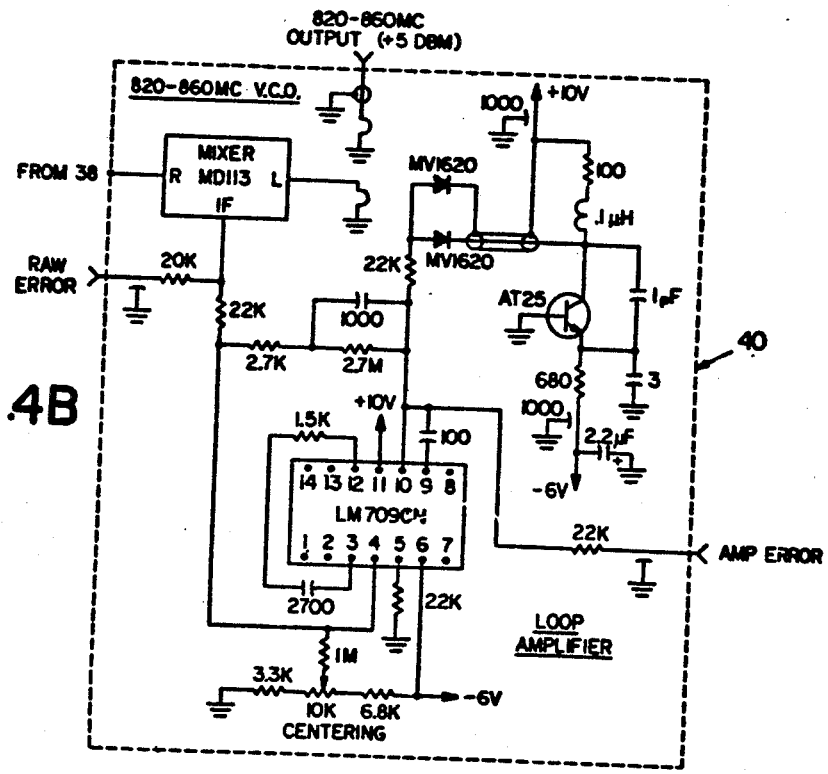
FIG. 4B is an illustrative circuit of the phase locked oscillator of FIG. 2.
Figure 4A:
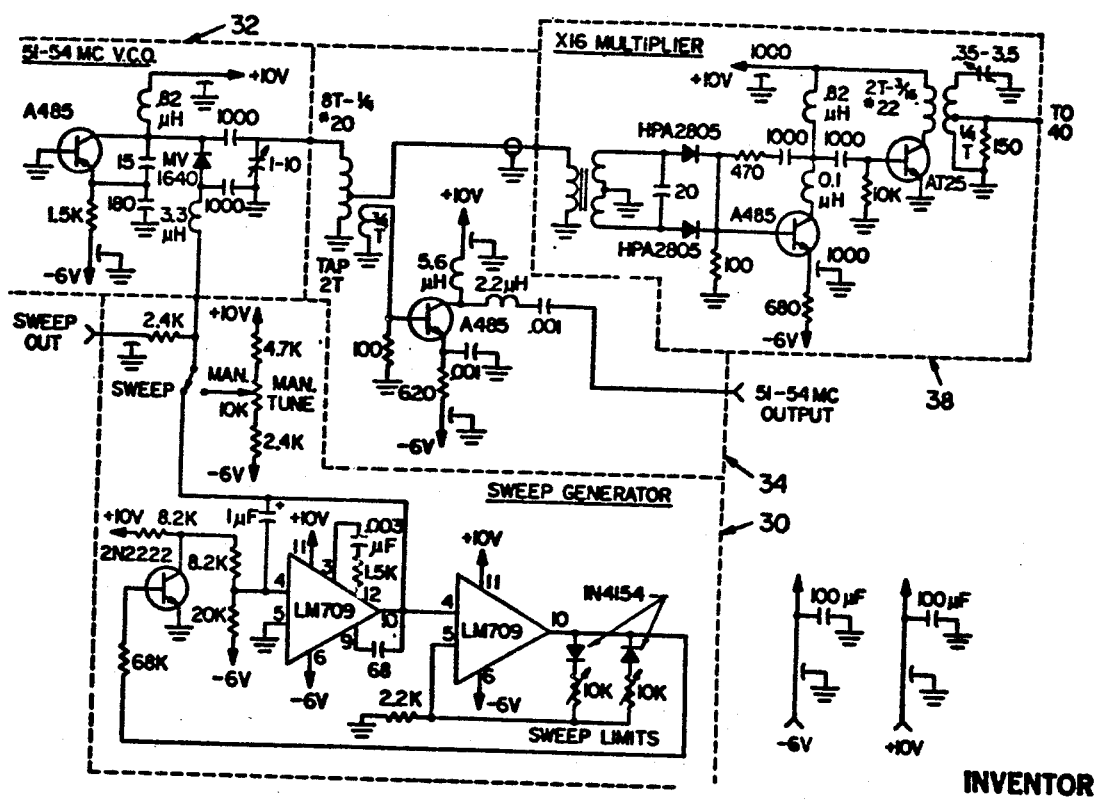
FIG. 4A is an illustrative circuit of elements 30, 32, 34, and 38 of FIG. 2.
Figure 4C:
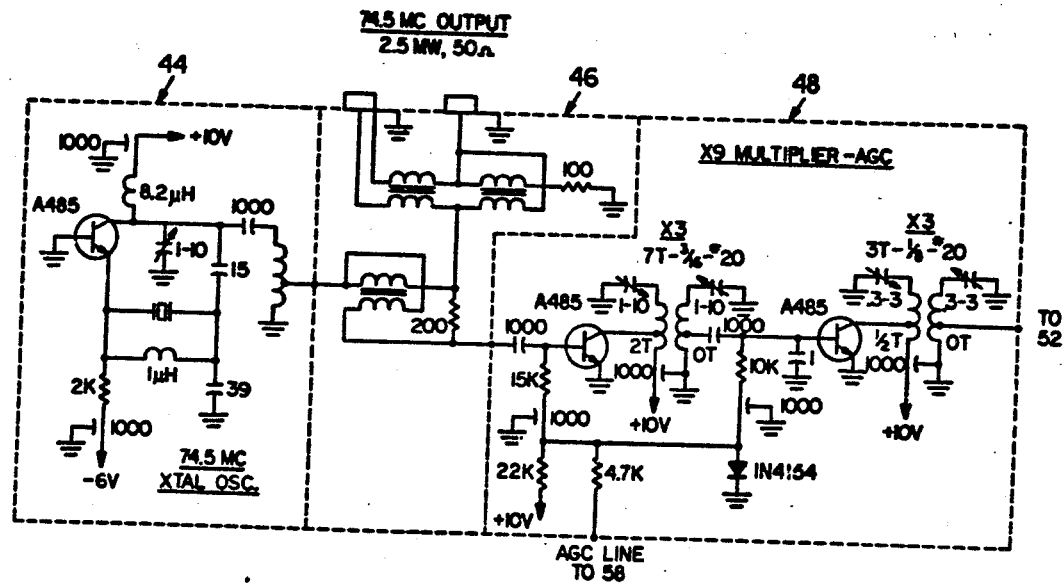
FIG. 4C is an illustrative circuit of elements 44, 46, and 48 of FIG. 2.
Figure 4D:
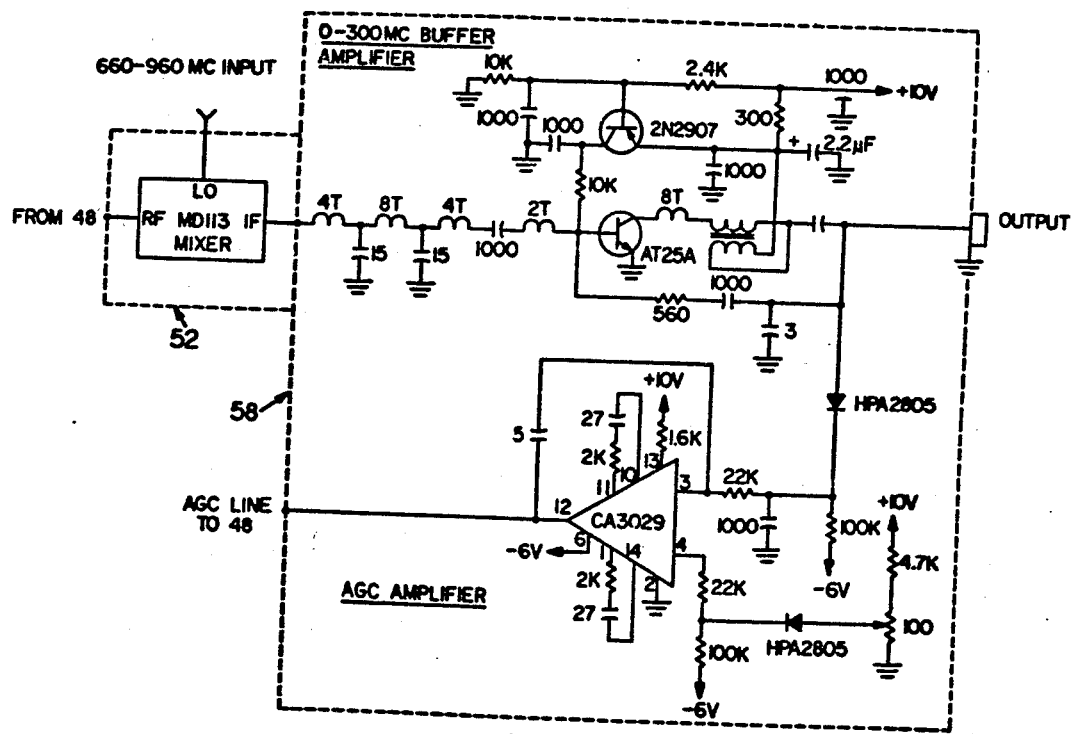
FIG. 4D is an illustrative circuit of the signal mixer and filter of FIG. 2.
Figure 4E:
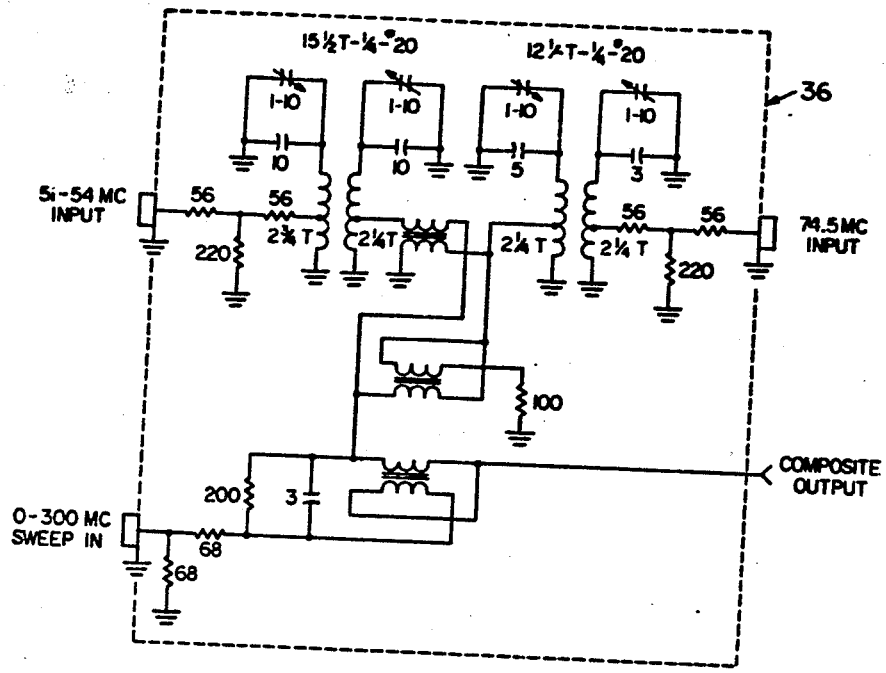
FIG. 4E is an illustrative circuit of the power combiner of FIG. 2.
Figure 5J:
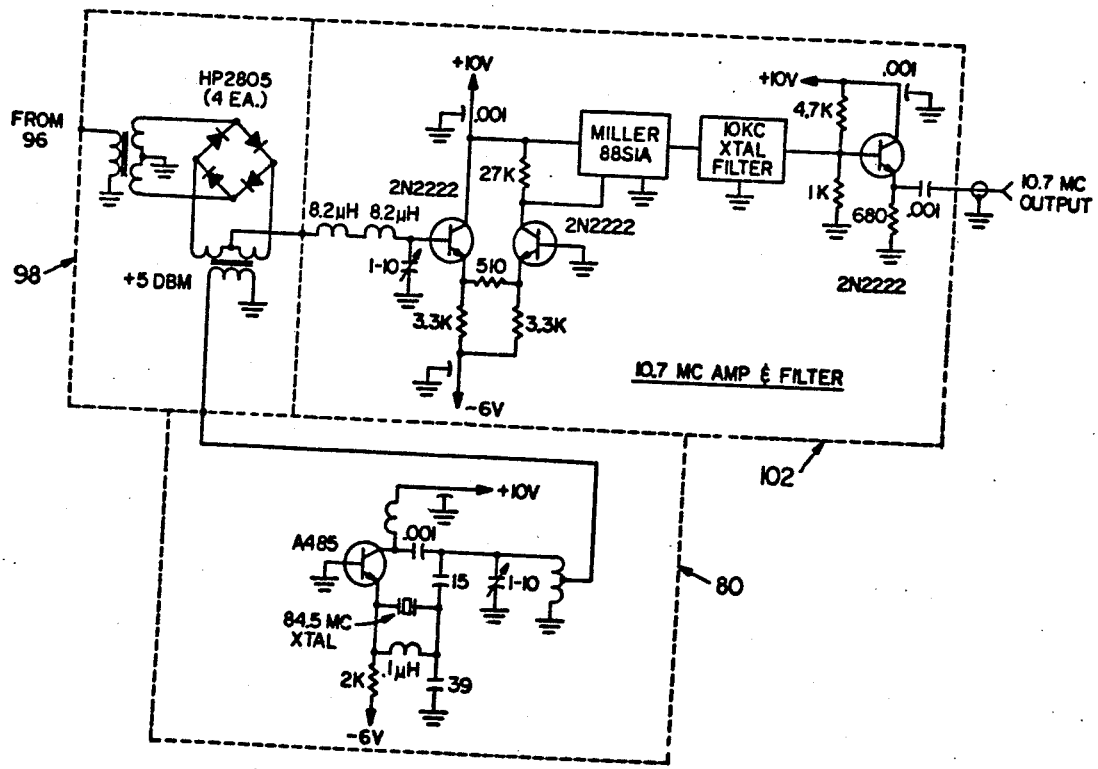
FIG. 5J is an illustrative circuit of the oscillator 80, the mixer 98, and the filter 102 of FIG. 3.
Figure 5I:
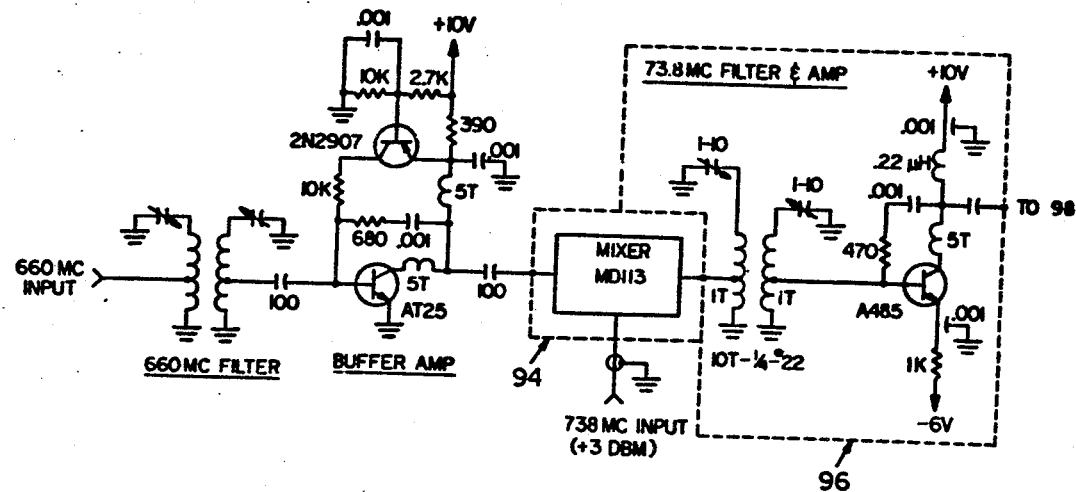
FIG. 5I is an illustrative circuit of the mixer 94 and filter 96 of FIG. 3.
Figure 4F:
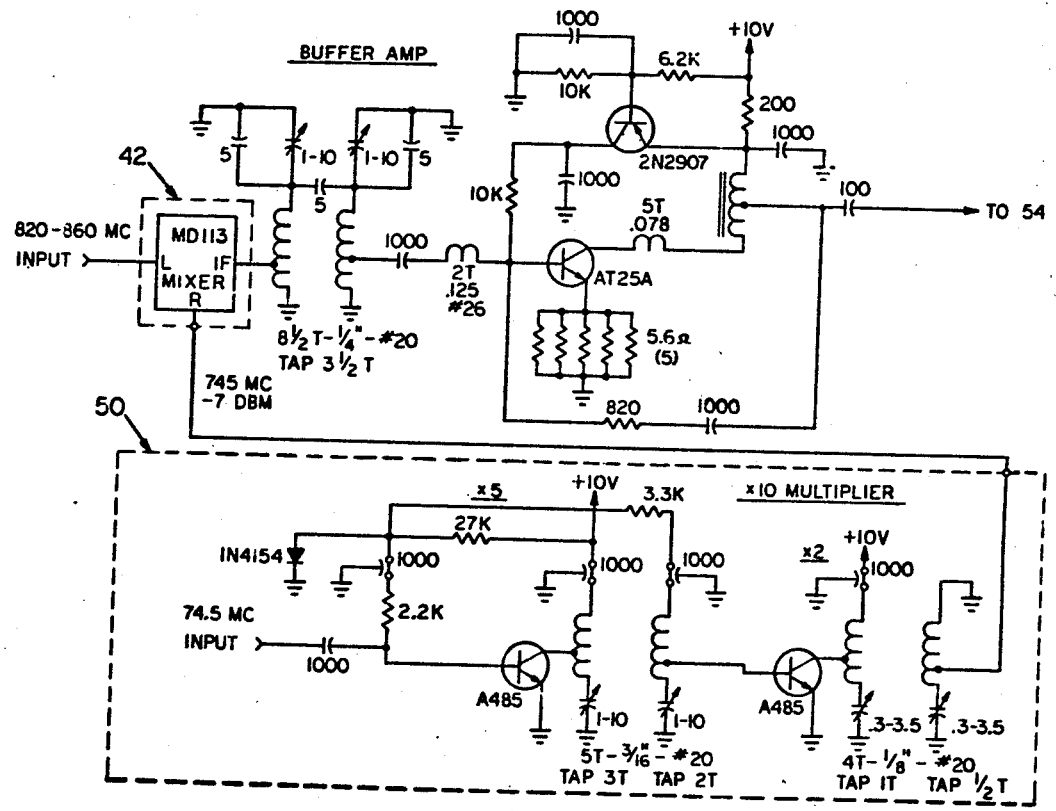
FIG. 4F is an illustrative circuit of the mixer 42 and the multiplier 50 of FIG. 2.
Figure 4G:
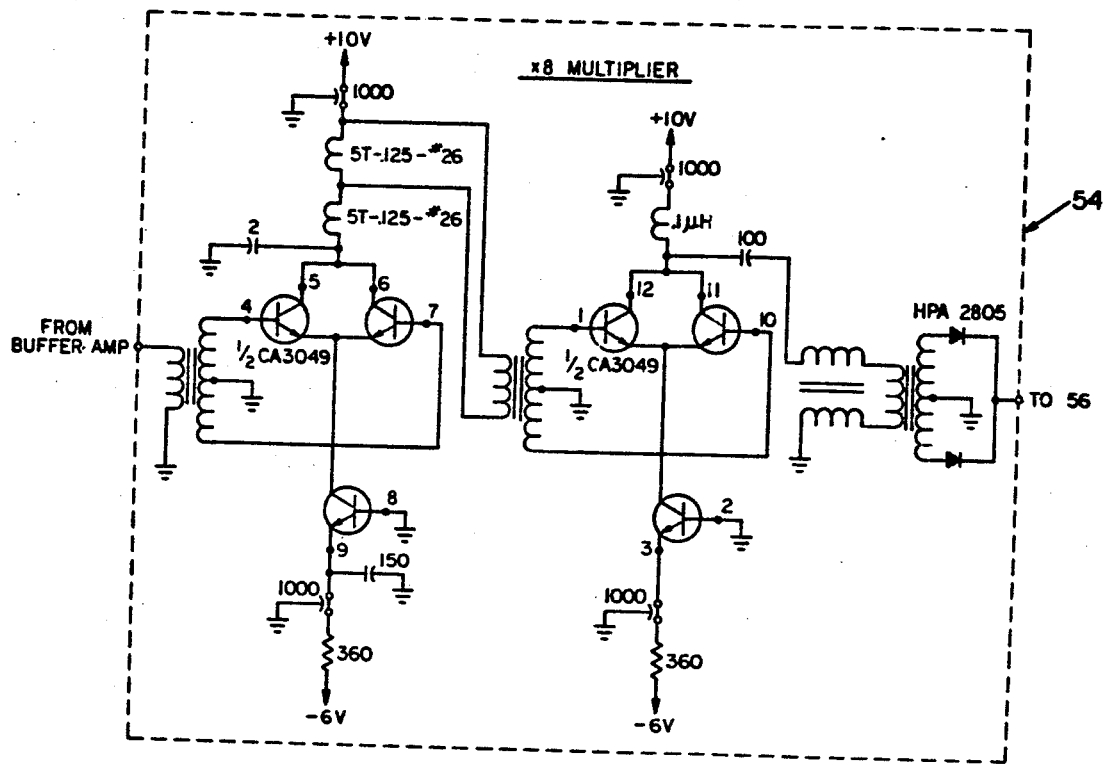
FIG. 4G is an illustrative circuit of the multiplier 54 of FIG. 2.
Figure 4H:
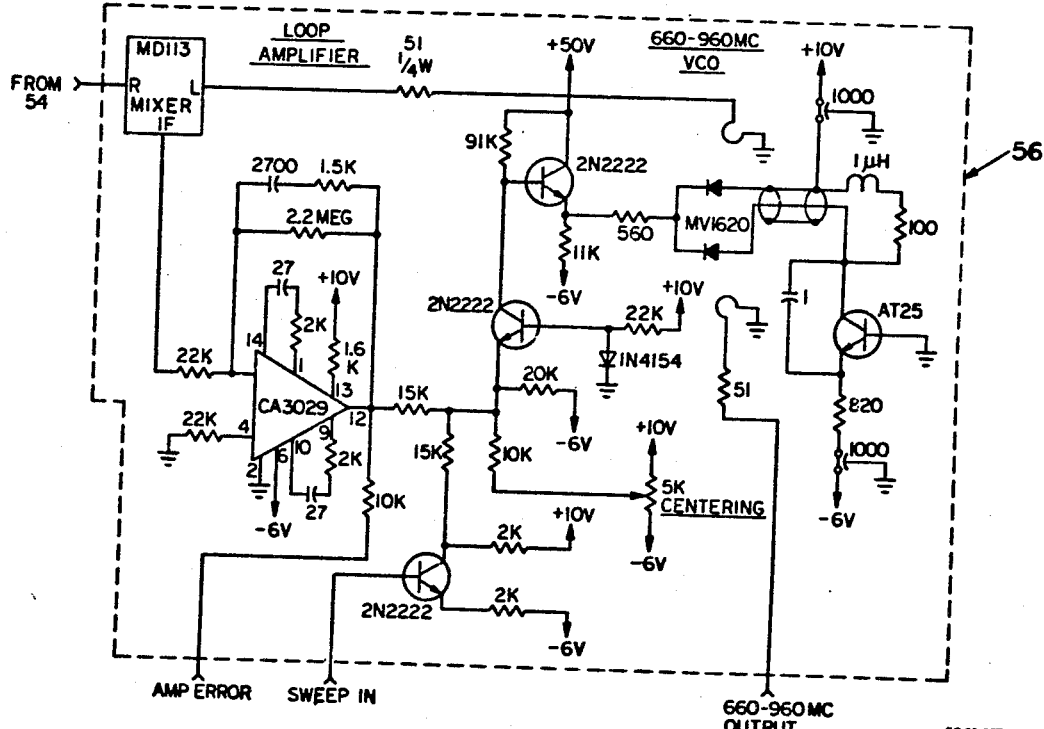
FIG. 4H is an illustrative circuit of the phase locked oscillator 56 of FIG. 2.
Figure 5A:
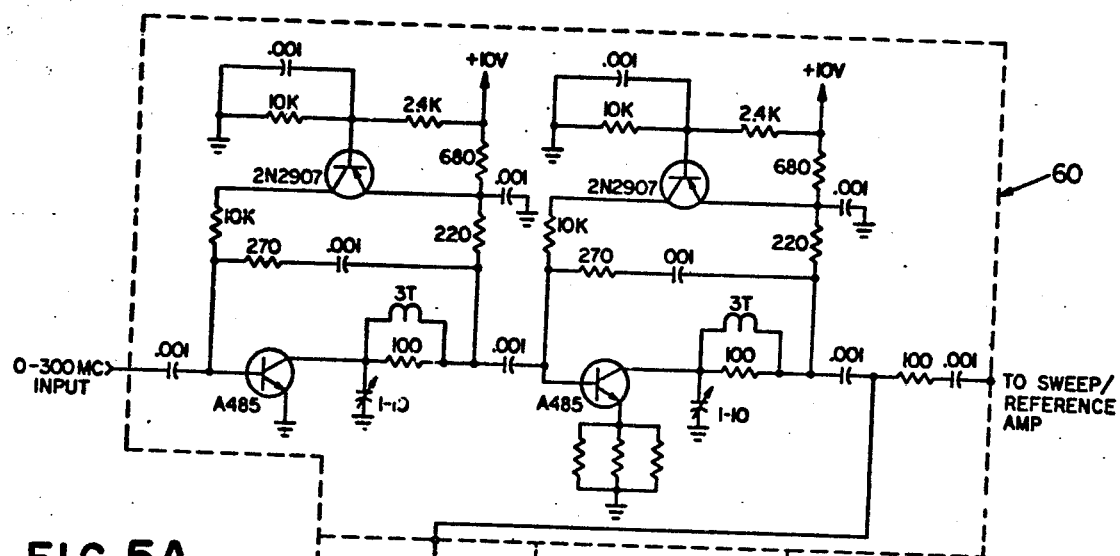
FIG. 5A is an illustrative circuit of elements 60, 90, and 92 of FIG. 3.
Figure 5B:
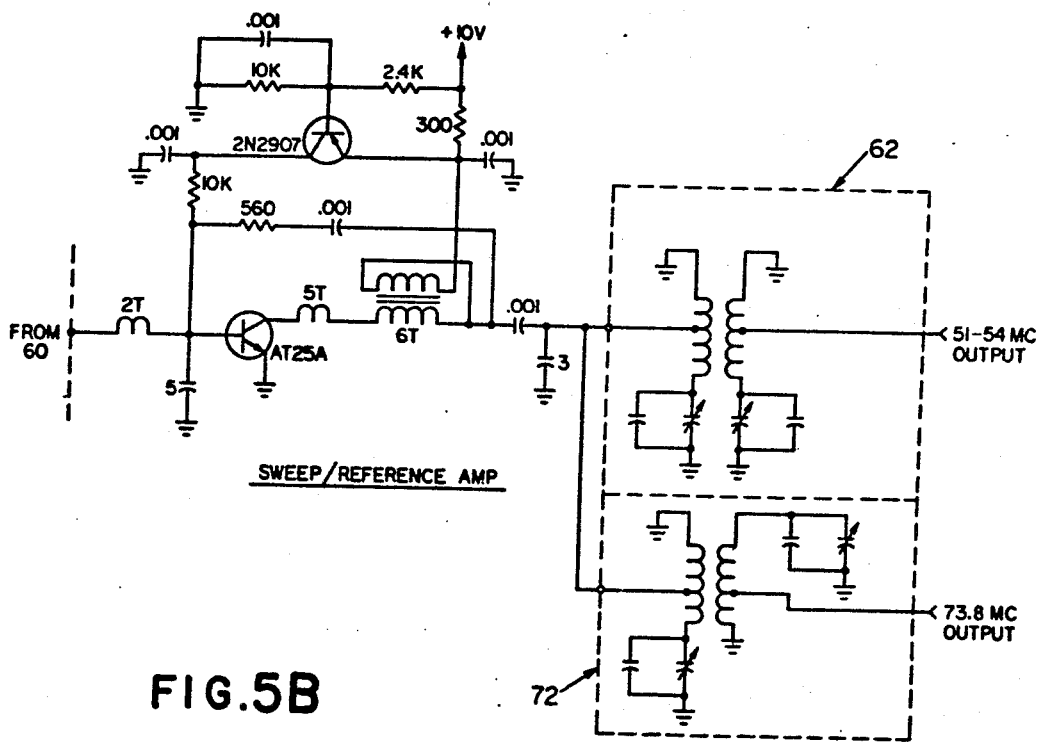
FIG. 5B is an illustrative circuit of the filter 62 of FIG. 3.
Figure 5D:
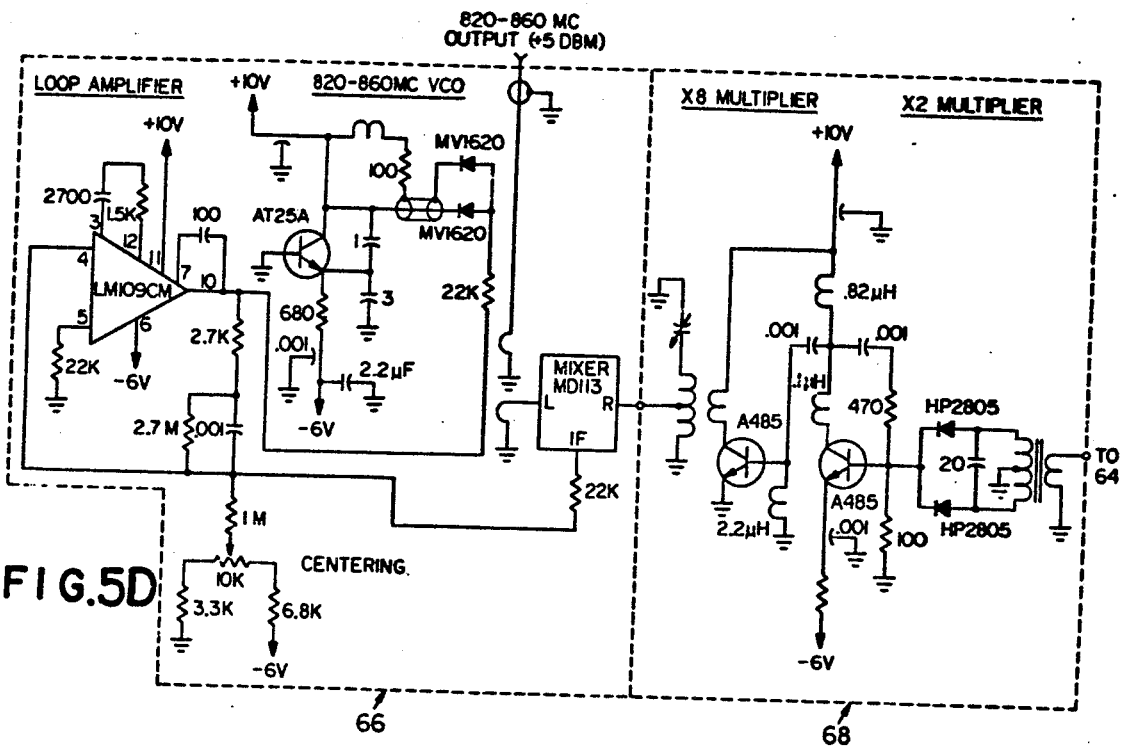
FIG. 5D is an illustrative circuit of the phase locked oscillator 66 and multiplier 68 of FIG. 3.
Figure 5C:
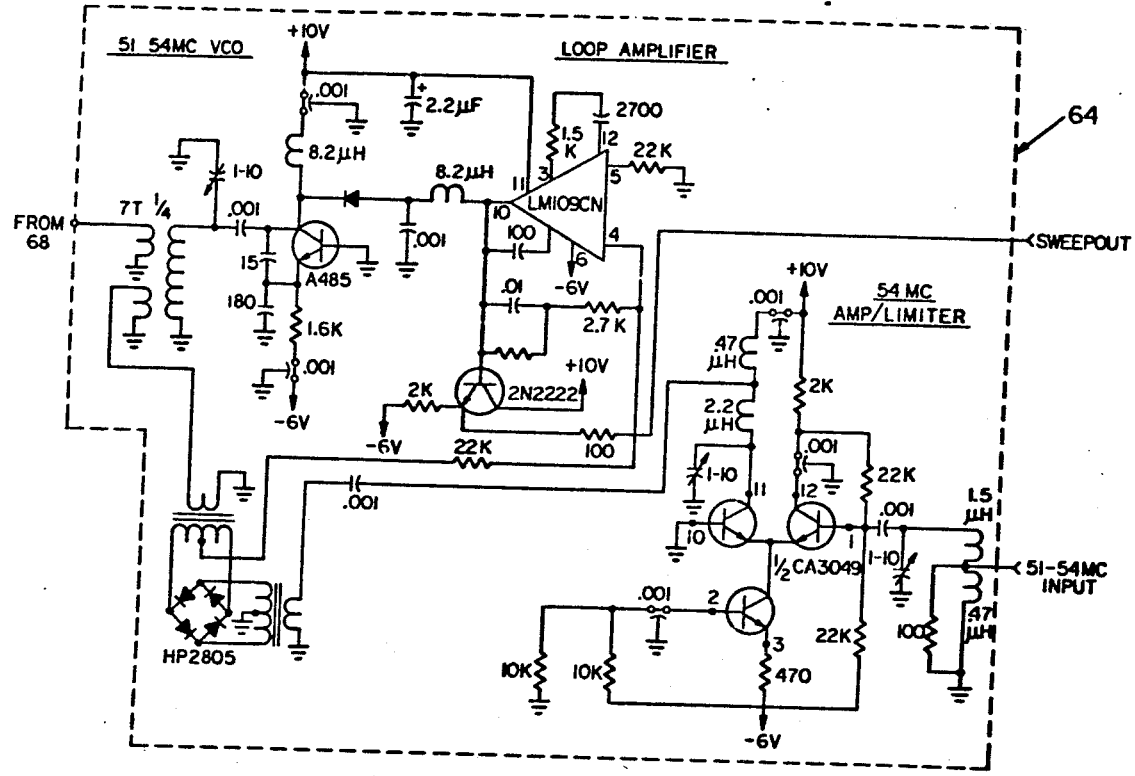
FIG. 5C is an illustrative circuit of the phase locked oscillator 64 of FIG. 3.
Figure 5E:
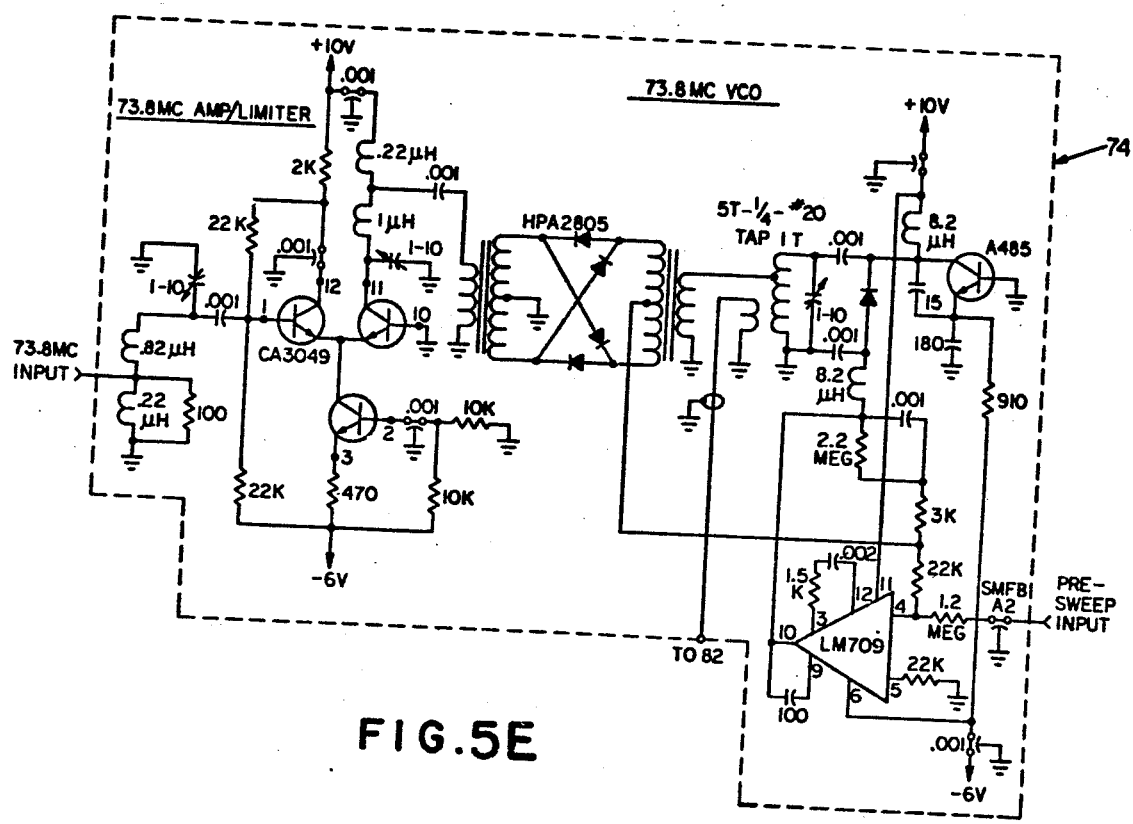
FIG. 5E is an illustrative circuit of the phase locked oscillator 74 of FIG. 3.
Figure 5F:
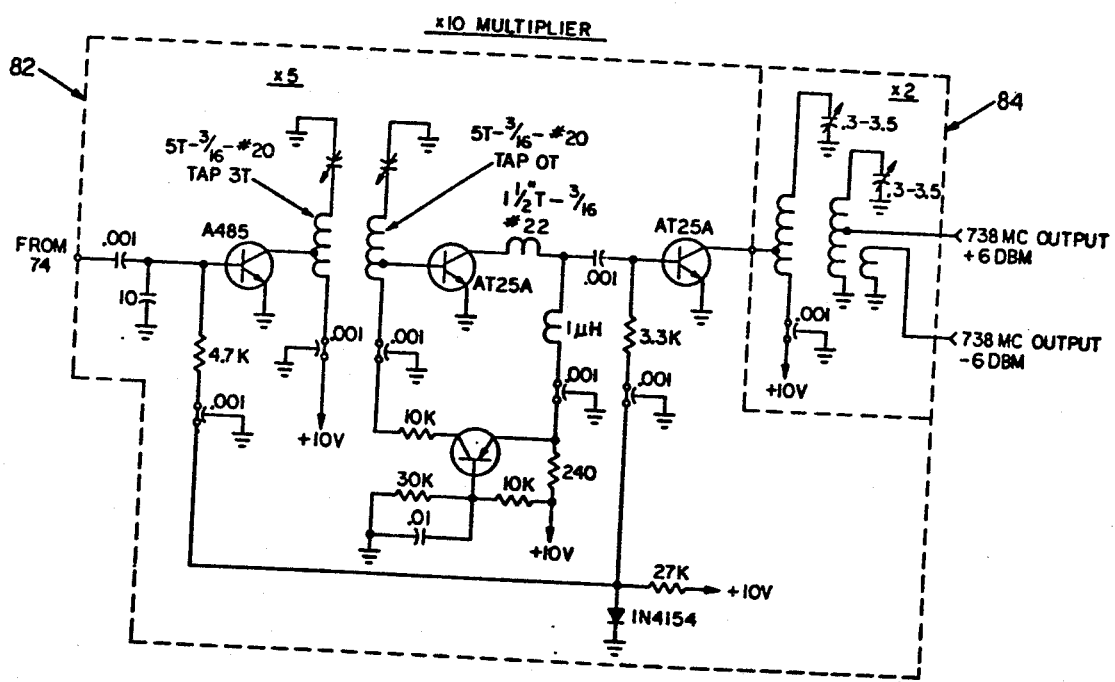
FIG. 5F is an illustrative circuit of the multiplier 82 and power divider 84 of FIG. 3.
Figure 5H:
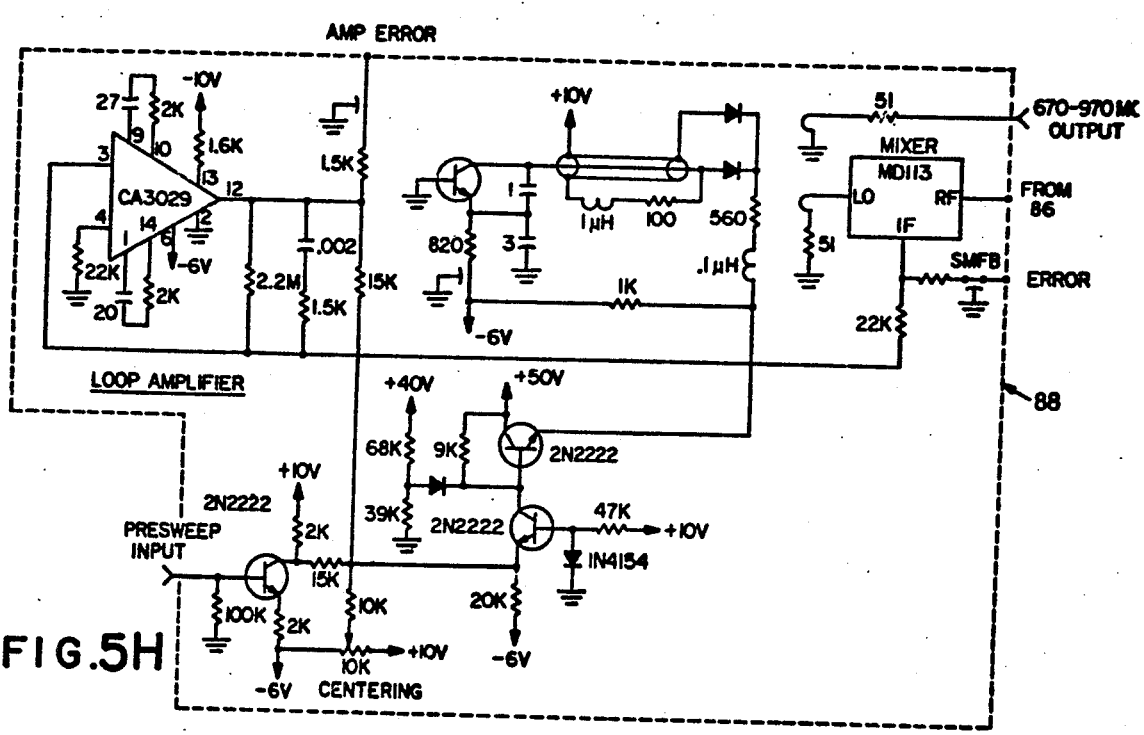
FIG. 5H is an illustrative circuit of the phase locked oscillator 88 of FIG. 3.
Figure 5G:
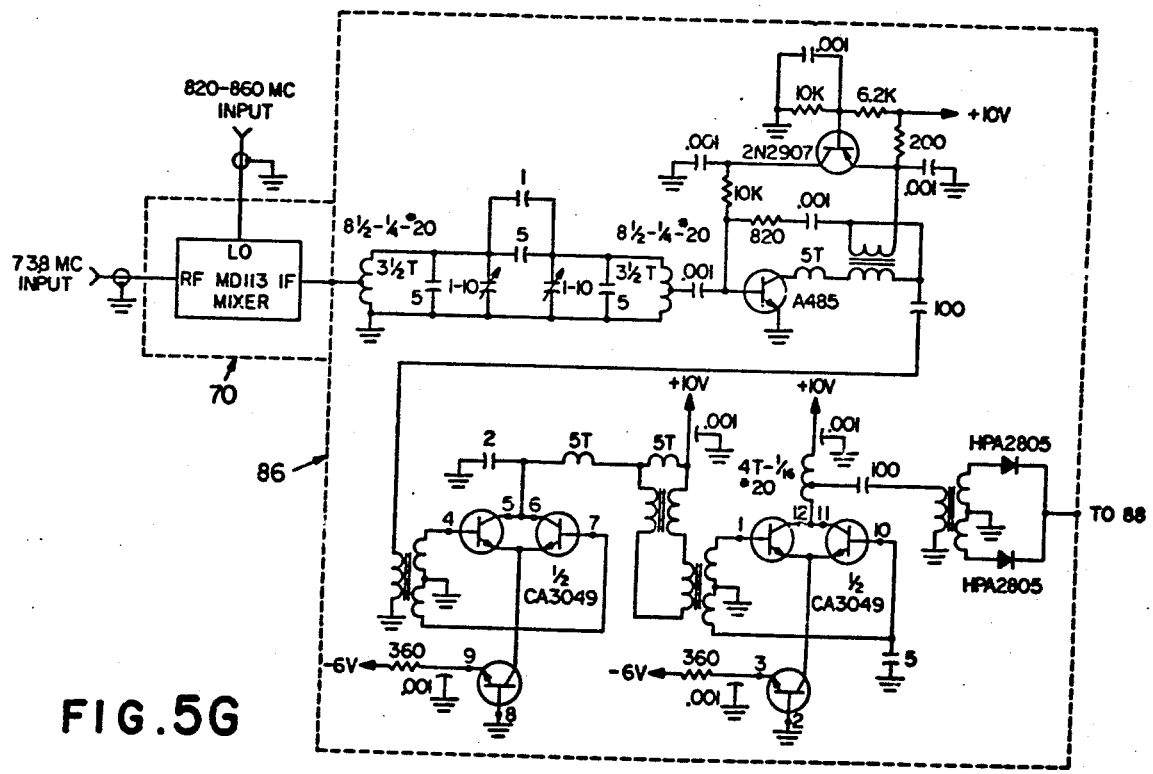
FIG. 5G is an illustrative circuit of the mixer 70 and multiplier 86 of FIG. 3.
Figure 5K:
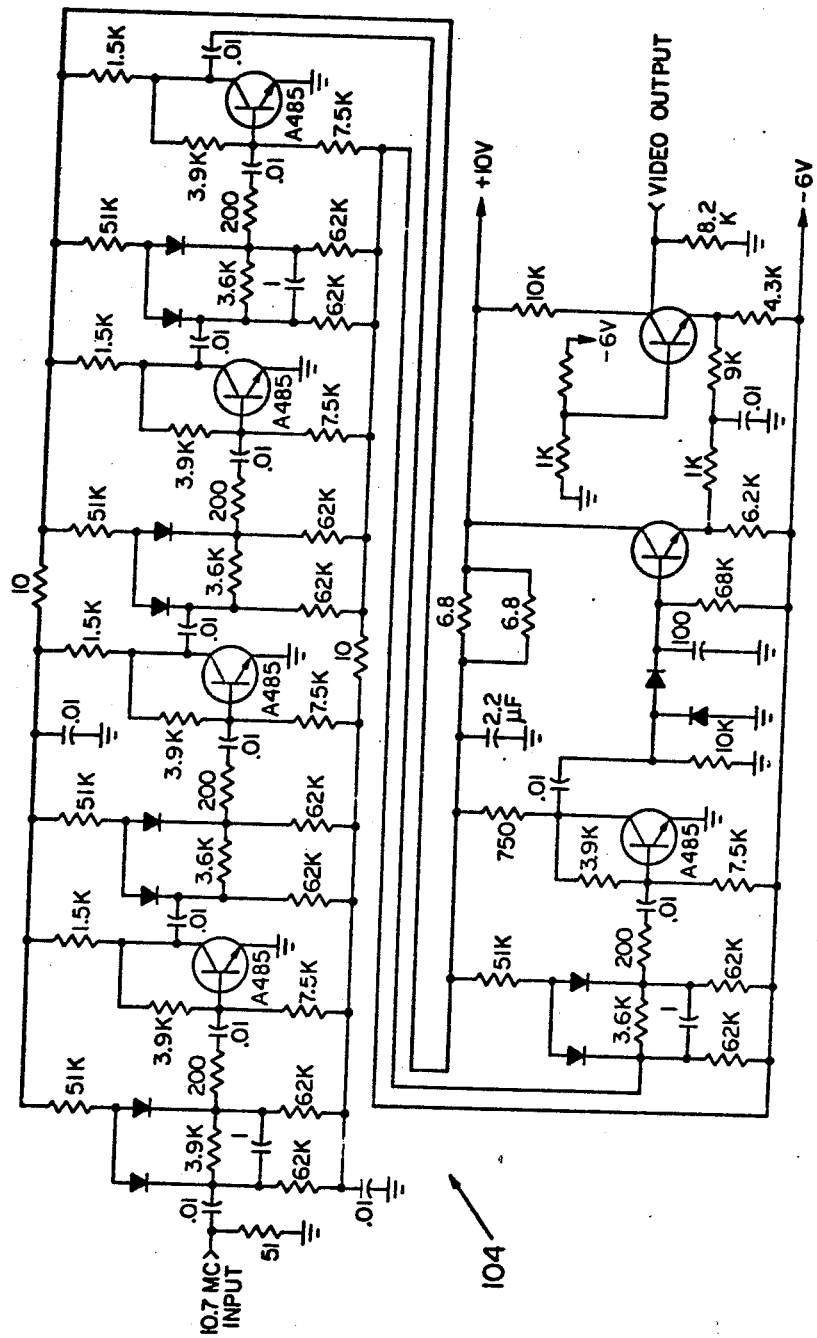
FIG. 5K is an illustrative circuit of the detector of FIG. 3.

Referring to FIG. 1, the transmission measurement test apparatus 10 includes transmission means, such as a transmitting test set (TTS) 12 and receiving means such as receiving test set (RTS) 14, located at the extreme ends of a portion 16 of a transmission network being tested such as an analog cable system used for cable T.V. The TTS transmits two reference signals $f_1$ (fixed) and $f_2 \rightarrow f_3$ (sweeping over a narrow band) and a test signal $f_4 \rightarrow f_5$ that sweeps over the frequency range of the cable to be tested. Of great importance is the fact that the test signal $f_4 \rightarrow f_5$ is derived from the two reference signals $f_1$ and $f_2 \rightarrow f_3$.

The non-interfering characteristic of the present invention is largely accomplished by operating the test signal at a level far below the normal signals on the cable 16. The test signal is typically 30 dB below the normal signals. Additional interference reduction is accomplished by employing a fast sweep that minimizes the time period when the test signal is in the vicinity of a carrier signal. Detection of the low level test signal requires the employment of a narrow intermediate frequency (IF) passband in the RTS 14 to establish an adequate signal-to-noise ratio. In order to make use of the narrow IF passband, it is required that the RTS 14 very closely tracks the test signal generated by the TTS 12.

The test signals are coupled onto the cable through a directional coupler 18 and transmitted down the cable. At the RTS 14, another coupler 20 directs the three signals into the RTS 14. The RTS 14 processes the two reference signals $f_1$ and $f_2 \rightarrow f_3$ to produce the local oscillator signals for the RTS in a manner described subsequently. Since the test signal, $f_4 \rightarrow f_5$, is derived from the same reference signals $f_1$ and $f_2 \rightarrow f_3$ as the local oscillator of the RTS, the RTS exactly follows the sweeping test signal $f_4 \rightarrow f_5$. The IF bandwidth of the RTS can now be made extremely narrow since the RTS is tuned at all times to the sweeping test signal $f_4 \rightarrow f_5$.

The reference signals $f_1$ and $f_2 \rightarrow f_3$ are so chosen that they do not interfere with the normal signals. For example, in a practical analog cable system such as CATV, the fixed reference signal, $f_1$, is located in the guard band 72–76 MHz and $f_2 \rightarrow f_3$ is located at 51.3 – 53.7 MHz, safely below Channel 2. Similar guard bands and "free" areas exist in other cable systems such as AT & T's L-4 and L-5 carriers.

One embodiment of the TTS 12 is illustrated in FIG. 2. A sweep generator 30 develops a continuous repetitive voltage ramp at a repetition frequency compatible with the particular analog cable system being measured. The output from the generator 30 tunes the resonant circuit of the voltage controlled oscillator 32 so that a sweep frequency output ranging from $f_2 \rightarrow f_3$ is generated in step with the sweep generator 30. A power divider 34 then splits the output of the voltage controlled oscillator 32 directing part of the signal to the output power combiner 36, where it becomes one of the two reference signals, and the remainder of the signal to a $xp$ frequency multiplier 38. The value of the integer "p" is tailored to the particular cable system to be measured.

The output of the multiplier 38 drives a phase locked oscillator 40 that generates a spurious-free replica of the multiplied frequency $p(f_2 \rightarrow f_3)$. The output of the phase locked oscillator 40 is directed to a frequency mixer 42 where it is then mixed with a multiplied replica of the other fixed reference signal.

The crystal controlled oscillator 44 generates the fixed frequency reference signal, $f_1$. This signal is split into three paths by the power divider 46. One path leads directly to the output power combiner 36. Another path leads to a $xn$ frequency multiplier 48. The third path leads to a $xm$ frequency multiplier 50. It is the output of this multiplier 50, $mf_1$, that is mixed with the output of the phase locked oscillator 40 in the mixer 42 to produce a new varying frequency, $p(f_2 \rightarrow f_3) - mf_1$.

The output of the $xn$ frequency multiplier 48 is then directed to a signal mixer 52. The signal, $p(f_2 \rightarrow f_3) - mf_1$, is multiplied by a $xr$ frequency multiplier 54, purified by a phase locked oscillator 56 and directed to the signal mixer 52, where it is mixed with the output of the $xn$ frequency multiplier 48, $nf_1$, to produce a new varying signal $r\{p(f_2 \rightarrow f_3) - mf_1\} - nf_1$. This signal is designated $f_4 \rightarrow f_5$. It is the test signal that will be used to sweep the analog cable system. The values of the multipliers "p", "r", "n" and "m" are carefully chosen so that the required test signal can be generated from the two non-interfering reference signals $f_1$ and $f_2 \rightarrow f_3$.

The test signal $f_4 \rightarrow f_5$ is processed through a band-pass (low pass in the case of CATV systems) filter 58 to eliminate spurious, out of band, signals. The result enters the power combiner 36 where it is combined with the reference signals $f_1$ and $f_2 \rightarrow f_3$. The combined signals then enter the cable system by way of a directional coupler 18.

Thus the $f_4 \rightarrow f_5$ test signal is derived from $f_1$ and $f_2 \rightarrow f_3$ by multiplying $f_2 \rightarrow f_3$ by selected values to expand the bandwidth thereof and then lowering the over-all frequencies which result by mixing and "beating down" the resulting signal by using a multiplied version of $f_1$. In the embodiment of FIG. 2 this beating down process occurs at two places in the circuit, the first at mixer 42 and the second at mixer 52.

One embodiment of the RTS 14 of FIG. 1 is illustrated in FIG. 3. The two reference signals $f_1$ and $f_2 \rightarrow f_3$, together with the test signal $f_4 \rightarrow f_5$, are picked off the portion of the cable system under test by the directional coupler 20. These signals are split into three paths by the power divider 60. The first path is the signal path and is concerned only with $f_4 \rightarrow f_5$. The other two paths concern themselves with the two reference signals $f_1$ and $f_2 \rightarrow f_3$. These reference signals are processed by the circuits to be described to generate the sweeping local oscillator signals that precisely track the test signal $f_4 \rightarrow f_5$.

A bandpass filter 62 selects the reference frequency $f_2 \rightarrow f_3$ and directs it to a chain of phase locked oscillators 64 and 66 and a $xp$ multiplier 68, so that a pure signal, $p(f_2 \rightarrow f_3)$, is sent to the signal mixer 70.

In a similar manner, the reference signal $f_1$ is selected by the bandpass filter 72. A "clean" replica of the signal $f_1$ is generated by the phase locked oscillator 74. The $f_1$ signal then goes to a xm $xm$ multiplier 82 that produces a new signal, $mf_1$. The signal $mf_1$ is then split into two paths by the power divider 84.

One path leads to signal mixer 70 where the signal $mf_1$ is mixed with the output of the phase locked oscillator 66, $p(f_2 \rightarrow f_3)$, to produce a new varying signal, $p(f_2 \rightarrow f_3) - mf_1$. This signal is multiplied by a $xr$ frequency multiplier 86 to generate a new frequency, $r\{p(f_2 \rightarrow f_3) - mf_1\}$. The phase locked oscillator 88 then produces a "clean" replica of the signal and directs it to the signal mixer 90, where it mixes with the test signal, $f_4 \rightarrow f_5$, to produce the first intermediate frequency (First IF), $nf_1$. The narrow bandpass filter 92 removes any remaining spurious signals.

The First IF signal, $nf_1$, is then combined with the multiplied reference signal, $mf_1$, in the signal mixer 94 to produce the Second IF signal, $(n-m)f_1$. Once again, a bandpass filter 96 eliminates spurious signals.

The Second IF signal, $(n-m)f_1$, is then combined with a fixed signal, $f_1 + f_6$ provided by crystal oscillator 80 at mixer 98 after the latter is suitably filtered by bandpass filter 100. This produces the Third IF signal, $f_1 + f_6 - (n-m)f_1$. This signal is processed through a final bandpass filter 102 that sets the noise bandwidth of the RTS 14, and eliminates the $f_1$ and $f_2 \rightarrow f_3$ components of the signal received by the RTS 14.

In the case of the CATV repeatered cable system, the integers "$n$" and "$m$" are 10 and 9 respectively, differing only by one (1); therefore, the Third IF frequency is simply $f_6$. The Third IF frequency signal is detected at 104 and displayed for example, on a cathode ray tube 106. The detected signal, which typically appears as a plot of the amplitude of the test signal, $f_4 \rightarrow f_5$, versus frequency, can also be stored in either analog or digital form for later evaluation or rerouted to a central office that can monitor one or more RTS 14 units to evaluate the performance of the cable system.

While it is believed that the above description of the invention is sufficient to enable one skilled in the art to construct a transmission test apparatus in accordance with the present invention, detailed schematic circuit diagrams illustrating one operative embodiment of the invention are provided in FIGS. 4A-H (transmission set) and FIGS. 5A-K (receiving set). Of the components not shown in detail in FIG. 4, directional couplers 18 and 20 can be any suitable standard component, such as Jerrold, Inc. Model DC-16 directional coupler. Cathod ray tube 106 can be any cathode ray oscilloscope with horizontal and vertical drive circuits included.

The embodiment of FIGS. 4 and 5 is specifically designed for use in measuring the transmission characteristics of a CATV cable transmission network. For this application, the various parameters associated therewith are as follows:

| | | |
|---|---|---|
| $f_1$ | — | 73.8 MHz |
| $f_2 \rightarrow f_3$ | — | 51.3 → 53.6 MHz |
| $f_4 \rightarrow f_5$ | — | 27.0 → 270.0 MHz |
| $f_6$ | — | 10.7 MHz |
| m | — | X10 |
| n | — | X9 |
| p | — | X16 |
| r | — | X8 |

In the preferred embodiment described above, all sweeping signals, test signal $f_4 \rightarrow f_5$, the RTS local IF oscillator signals, $r\{p(f_2 \rightarrow f_3)\} - mf_1$, are derived from two common reference signals, $f_1$ and $f_2 \rightarrow f_3$. This unique signal generation scheme provides the basic ingredient for this highly sensitive, non-interfering transmission measuring test set. Additionally, by using the same reference signals, $f_1$ and $f_2 \rightarrow f_3$ in the RTS oscillator, inherent drift problems and sync problems are avoided.

For the purposes of the invention, it is not necessary that the reference signals $f_1$ and $f_2 \rightarrow f_3$ be transmitted over the transmission network under test. For example, they can be transmitted via an auxiliary line as, for example, via telephone or even by wireless transmission. Nor does it matter that the reference signals $f_1$ and $f_2 \rightarrow f_3$ originate at the TTS. For example, these reference signals could originate at the RTS and be transmitted to the TTS where the $f_4 \rightarrow f_5$ test signals are then generated.

Nor should the invention be limited to the testing of CATV cable lines. The present invention is applicable to other transmission networks such as auxiliary transmission lines or free space.

It is also contemplated that the present invention can be used by utilizing the reference signals to control a frequency synthesizer to scan the transmission channel of the network in steps. In particular, a frequency synthesizer sends sequential signals of a plurality of discrete frequency levels down the network being tested. The plurality of discrete frequencies are selected to cover the entire bandwidth of the transmission network, and correspond generally to the $f_4 \rightarrow f_5$ test signal.

A corresponding frequency synthesizer is located at the opposite end of the network under test for receiving and processing the test signals. Synchronization between the transmitting and receiving frequency synthesizer is assured by a clock signal originating at the transmitting end of the system. The clock signal is responsible for stepping the frequency of the transmitting frequency synthesizer and of the receiving frequency synthesizer by operating a stepping counter to drive the frequency synthesizer.

An embodiment of this invention utilizing a frequency synthesizer is shown in FIG. 6. In the illustrated embodiment in the transmitter set 111, a frequency synthesizer 112 is used to generate the test signal, and a clock digital counter 113 causes the synthesized test signal to step across the band of interest. The frequency reference for the synthesizer, and the clock signal for the counter controlling the synthesizer, are transmitted to the receiving equipment 114. At the receiving equipment 114, the reference frequency and clock signals are used to control another synthesizer 115, so that the test signal receiver tracks the test signal coming over the system in just the same way as for the analog implementation described above.

One way to construct the apparatus and to carry out the process shown in FIG. 6 is to transmit the clock signal by amplitude modulation of a carrier frequency located at some unoccupied frequency within the passband of the system under test. Since the frequency reference is also transmitted, it is possible that in some cases the frequency may provide a suitable carrier for the clock signal, at a useful reduction in cost. The digitally programmable synthesizer can be built in a variety of ways; the Hewlett-Packard Model 5105A/5110B synthesizer is a commercially available unit that would be satisfactory in some applications. The clock signal and digital counter techniques are well known to those skilled in the art.

In the particular application to CATV cable testing, a useful simplification can be made by taking advantage of the fact that the TV signals normally carried by the system contain clock signals, the horizontal and vertical synchronizing pulses, that are suitable for use as the clock signals for the test equipment. In this case, the clock signals need not be separately transmitted over the cable. It is also possible to use the carrier frequency of one of the TV signals as the frequency reference, so that for this application no extra signals need to be added to those on the cable in order to operate the test equipment.

In the CATV embodiment described above with reference to FIGS. 1–5, the sweep test signal $f_4 \rightarrow f_5$ was derived from the fixed frequency reference signal $f_1$ and the sweep reference signal $f_2 \rightarrow f_3$. While this is a convenient method of providing the various signals, the important consideration is not that the various signals be derived in a particular manner, but rather that the sweep test signal and the reference signal be interrelated.

Thus, for example, instead of deriving $f_4 \rightarrow f_5$ from $f_2 \rightarrow f_3$ and $f_1$, in an alternate embodiment $f_2 \rightarrow f_3$ can be derived from a generated $f_4 \rightarrow f_5$ and $f_1$ signal.

Similarly, $f_1$ can be provided by utilizing an existing fixed frequency broadcast signal, such as the WWV signal which is continually broadcast by the U.S. Government.

I claim:

1. Apparatus for measuring the transmission response of a transmission network for transmitting regular operating signals, said signals having a predetermined intensity range, comprising:
   first means located at one end of the network being tested for generating a test signal, sweeping over a range of frequencies including at least a portion of the range of frequencies in which said regular operation signals are transmitted,
   means for transmitting said sweeping frequency test signal at an intensity below that of regular operating signals transmitted through said network, along a path of said network to the other end thereof,
   second means for generating a reference signal wherein said reference signal comprises a fixed frequency reference signal and a sweeping frequency reference signal both non-interfering with the regular operating signals transmitted across the network, said sweeping frequency reference signal interrelated in frequency to said sweeping frequency test signal,
   means for transmitting said sweeping frequency reference signal over said path between ends of the network;
   third means located at said other end of the network being tested and receiving said sweeping frequency and fixed frequency signals and said sweeping frequency test signal, said third means including means synchronized by said sweeping frequency reference signal for providing the information content of the instantaneous frequency of said sweeping frequency test signal, said third means further including means receiving said information content of the instantaneous frequency of said sweeping frequency test signal for tracking said sweeping frequency test signal, and
   means coupled to said third means at said other end of the network for monitoring the intensity of said sweeping frequency test signal.

2. Apparatus as in claim 1 wherein
   said second means includes means for transmitting said fixed frequency signal and said sweeping reference signal across said transmission network to said third means.

3. The apparatus in accordance with claim 1 wherein said third means includes means for mixing said fixed frequency and said sweeping reference signals to convert said sweeping frequency test signal to a predetermined frequency bandwidth.

4. The apparatus of claim 3 wherein
   said second means is located at the same end of the network as said first means and
   said fixed frequency reference signal and said sweeping reference signal are transmitted along with said sweeping frequency test signal along said said path of said network.

5. The apparatus as in claim 3 wherein said network being tested comprises CATV system transmission cables.

6. The apparatus as in claim 5 wherein said cables are connected to a CATV system having a broadcast frequency range and selected guard frequency bands and the frequency range of said sweeping reference signal is selected below the CATV system broadcast frequency range.

7. The apparatus as in claim 6 wherein said fixed frequency reference signal is selected from within a guard frequency band of the CATV system.

8. The apparatus as in claim 7 wherein
   the frequency range of the sweeping test signal is from about 20 to about 300 MHz,
   the range of the sweeping reference signal is about 51 to 54 MHz, and
   the fixed frequency reference signal is about 74 MHz.

9. The apparatus as in claim 7 wherein
   said second means is located at the same end of the network as said first means and
   said fixed frequency reference signal and said sweeping reference signal are transmitted along with said sweeping frequency test signal along said network being tested.

10. The method of measuring the transmission response of a transmission network normally carrying operating signals having a predetermined intensity range from a transmitting point to a receiving point comprising the steps of:

generating at said transmitting point a reference signal sweeping over a range of frequencies;

generating at said transmitting point a test signal having an intensity less than that of said operating signals interrelated in frequency to said reference signal;

transmitting said reference signal and said test signal over the same path between said points;

receiving and tracking said test signal in response to said reference signal at said receiving point.

11. The method of claim 10 wherein said reference signal and said test signal are generated continuously.

12. A transmission measuring apparatus for measuring the transmission response of a transmission network carrying operating signals having a predetermined intensity range from a transmission point to a receiving point comprising:

means at said transmission point for generating a reference signal sweeping over a range of frequencies;

means at said transmission point receiving said reference signal for generating a test signal at an intensity below that of said operating signals interrelated in frequency to said reference signal;

means for transmitting said reference signal and said test signal over the same path between said points; and means at said receiving point receiving said test signal and said reference signal for measuring the transmission response between said points, said measuring means including receiver means for tracking said test signal in response to a control signal and synchronizing means receiving said reference signal for generating said control signal and applying said control signal to said receiver means.

13. The apparatus of claim 12 further comprising means for generating a fixed frequency reference signal and wherein said receiver means includes a narrow band receiver and wherein said control signal is the local oscillator signal of said receiver, and wherein said synchronizing means comprises means for generating said receiver local oscillator signal from said fixed frequency reference signal and from said sweeping frequency reference signal.

14. The apparatus of claim 13 wherein a CATV system broadcast cable network is located between said points and said CATV system has a broadcast frequency range and selected guard frequency bands, and wherein said sweeping frequency reference signal has a range below that of the CATV broadcast range.

15. The apparatus of claim 14 wherein the fixed frequency reference signal is selected from a guard band within the CATV broadcast range.

16. Apparatus for measuring the transmission response of a transmission network for transmitting normal operating signals of a given frequency band comprising means for generating a sweep test signal at least 20 dB below the normal operating signals and sweeping over a frequency band at least as great as the given frequency band, said generator means comprising:

means for generating a fixed frequency signal, means for generating a sweep reference signal sweeping over a frequency band outside the frequency band of said normal operating signals, means for multiplying said sweep reference signal to expand the bandwidth thereof, and means for lowering the bandwidth frequency range of said multiplied signal by a multiple of said fixed frequency signal therefore to form said sweep test signal;

means for transmitting said sweep test signal along the transmission network being tested; and means for receiving and tracking said sweep test signal at the opposite end of the transmission network being tested;

means for providing said fixed frequency signal and said sweep reference signals to said receiving means, said receiving means including means including mixing means for providing IF frequency signals for beating down the frequency of said sweep test signal to a narrow bandwidth signal, means for detecting said narrow bandwidth signal and monitoring the intensity thereof; and means for receiving said fixed frequency signal and said sweep reference signals;

said IF frequency signals providing means including means for utilizing said fixed frequency signal and said sweep reference signal for providing said IF frequency signals.

17. Apparatus as in claim 16 wherein said fixed frequency signal is at a frequency which is non-interfering with the normal operating signals transmitted over said transmission network;

said sweep reference signal has frequencies contained within a bandwidth which is non-interfering with the normal operating signals; and said transmission means including means for transmitting said fixed frequency signal and said reference signal across said transmission network to said receiving means.

18. Apparatus as in claim 17 wherein said network being tested comprises CATV system cables with the CATV system having a broadcast frequency range and selected guard frequency bands, said swept reference sweep below the CATV broadcast frequency range and said fixed frequency reference signal within one of the guard frequency bands.

19. Apparatus as in claim 18 wherein the frequency range of the sweeping test signal is from about 20 to about 300 MHz, the range of the sweeping reference signal is about 51 to 54 MHz, and the fixed reference signal is about 74 MHz.

20. Apparatus for measuring the transmission characteristics of a transmission network over a range of frequencies in which signals are normally transmitted at a predetermined intensity range comprising means for generating and for applying to said transmission network a reference signal sweeping over a range of frequencies outside said range of frequencies in which signals are normally transmitted in said network, means receiving said reference signal for generating and for applying to said transmission network a test signal interrelated with said reference signal frequency sweeping over a range of frequencies including at least a portion of said range of frequencies in which signals are normally transmitted, and receiver means connected to said transmission network and receiving said reference signal for tracking said interrelated test signal.

21. The apparatus of claim 20 wherein said receiver means includes means for monitoring the intensity of said test signal.

22. The apparatus of claim 21 wherein said test signal has an intensity below that of said signals normally transmitted in said network whereby there is no substantial interference to said signals.

23. The apparatus of claim 22 wherein the intensity of said test signal is at least 20 dB below the intensity of said signals normally transmitted through network.

24. The apparatus of claim 22 wherein said reference signal and said test signal are continuously generated and applied to said transmission network.

25. The apparatus of claim 24 wherein said receiver means tracking said test signal has a narrow bandwidth with respect to said range of frequencies in which signals are normally transmitted.

* * * * *

UNITED STATES PATENT AND TRADEMARK OFFICE
CERTIFICATE OF CORRECTION

PATENT NO. : 3,978,282
DATED : Aug. 31, 1976
INVENTOR(S) : Forrest F. Fulton, Jr.

It is certified that error appears in the above-identified patent and that said Letters Patent are hereby corrected as shown below:

Column 5, line 20, delete "xm" (first occurrence);

line 52 "106" should be --(106)--.

Claim 18, column 10, line 40, "sweept" should be --sweep--;

line 41, "sweep" should be --signal--.

Signed and Sealed this

Twenty-second Day of February 1977

[SEAL]

Attest:

RUTH C. MASON
Attesting Officer

C. MARSHALL DANN
Commissioner of Patents and Trademarks